US008364941B2

(12) United States Patent
Cornwell et al.

(10) Patent No.: US 8,364,941 B2
(45) Date of Patent: *Jan. 29, 2013

(54) SWITCHING DRIVERS BETWEEN PROCESSORS

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/902,094

(22) Filed: Oct. 11, 2010

(65) Prior Publication Data
US 2011/0029725 A1 Feb. 3, 2011

Related U.S. Application Data

(63) Continuation of application No. 11/686,097, filed on Mar. 14, 2007, now Pat. No. 7,814,304.

(51) Int. Cl.
*G06F 9/46* (2006.01)
*G06F 15/16* (2006.01)

(52) U.S. Cl. ............... 713/1; 713/2; 713/100; 712/35; 712/36; 711/163; 718/102; 718/104

(58) Field of Classification Search ............ 713/1, 2, 713/100; 712/35, 36; 711/163; 718/102, 718/104
See application file for complete search history.

(56) References Cited

U.S. PATENT DOCUMENTS

| 4,434,466 | A | 2/1984 | Friedli et al. ............ 364/200 |
| 5,602,987 | A | 2/1997 | Harari et al. |
| 5,671,229 | A | 9/1997 | Harari et al. |
| 5,706,478 | A | 1/1998 | Dye ............... 395/503 |
| 5,719,808 | A | 2/1998 | Harari et al. |
| 5,913,058 | A * | 6/1999 | Bonola ............... 713/2 |
| 6,149,316 | A | 11/2000 | Harari et al. |
| 6,426,893 | B1 | 7/2002 | Conley et al. |
| 6,721,820 | B2 | 4/2004 | Zilberman et al. |
| 6,757,842 | B2 | 6/2004 | Harari et al. |
| 6,763,424 | B2 | 7/2004 | Conley |
| 6,914,846 | B2 | 7/2005 | Harari et al. |
| 6,947,332 | B2 | 9/2005 | Wallace et al. |
| 7,133,938 | B2 | 11/2006 | Nagao ............... 710/10 |
| 7,137,011 | B1 | 11/2006 | Harari et al. |
| 7,162,569 | B2 | 1/2007 | Conley et al. |
| 7,237,046 | B2 | 6/2007 | Paley et al. |
| 7,237,074 | B2 | 6/2007 | Guterman et al. |
| 7,240,219 | B2 | 7/2007 | Teicher et al. |
| 2008/0028245 | A1 * | 1/2008 | Ober et al. ............ 713/324 |

* cited by examiner

*Primary Examiner* — M Elamin
(74) *Attorney, Agent, or Firm* — Meyertons, Hood, Kivlin, Kowert & Goetzel, P.C.

(57) ABSTRACT

Systems, methods, and computer software for operating a device can be used to operate the device in multiple modes. The device can be operated in a first operating mode adapted for processing data, in which a first processor executes a driver for a nonvolatile memory and a second processor performs processing of data stored in files on the nonvolatile memory. An instruction can be received to switch the device to a second operating mode adapted for reading and/or writing files from or to the nonvolatile memory. The driver for the nonvolatile memory can be switched from the first processor to the second processor in response to the instruction, and the driver for the nonvolatile memory can be executed on the second processor after performing the switch. A communications driver can be executed on the first processor in response to the instruction to switch the device to the second operating mode.

27 Claims, 3 Drawing Sheets

SWITCHING DRIVERS BETWEEN PROCESSORS

CROSS-REFERENCE TO RELATED APPLICATION

This application is a continuation of U.S. application Ser. No. 11/686,097, filed on Mar. 14, 2007, now U.S. Pat. No. 7,814,304, which is incorporated herein by reference.

TECHNICAL FIELD

This description relates to memory devices, and more particularly to switching a memory driver and other drivers between different processors.

BACKGROUND

As computing devices have increased in capabilities and features, demand for data storage devices has grown. Data storage devices have been used, for example, to store program instructions (i.e., code) that may be executed by processors. Data storage devices have also been used to store other types of data, including audio, image, and/or text information, for example. Recently, systems with data storage devices capable of storing substantial data content (e.g., songs, music videos, etc. . . . ) have become widely available in portable devices.

Such portable devices include data storage devices (DSDs) that have small form factors and are capable of operating from portable power sources, such as batteries. Some DSDs in portable devices may provide non-volatile memory that is capable of retaining data when disconnected from the power source. Portable devices have used various non-volatile data storage devices, such as hard disc drives, EEPROM (electrically erasable programmable read only memory), and flash memory.

Flash memory has become a widely used type of DSD. Flash memory may provide a non-volatile memory in portable electronic devices and consumer applications, for example. Two types of flash memory are NOR flash and NAND flash. NOR flash typically provides the capacity to execute code in place, and is randomly accessible (i.e., like a RAM). NAND flash can typically erase data more quickly, access data in bursts (e.g., 512 byte chunks), and may provide more lifetime erase cycles than comparable NOR flash. NAND flash may generally provide non-volatile storage at a low cost per bit as a high-density file storage medium for consumer devices, such as digital cameras and MP3 players, for example.

Typically, multiple drivers and other software modules may be used in connection with such devices. For example, a device typically includes a driver for the flash memory itself. In addition, some devices may include input/output (I/O) drivers as well as decoding software for interpreting or processing data stored in the flash memory. In some situations, different drivers or other software modules may be used at different times depending on the mode of operation of the device. For example, in an MP3 player, decoding software may be used when the device is operating in a playback mode, while an I/O driver may be used when the device is operating in a disk storage mode.

SUMMARY

Techniques can be implemented for efficiently allocating and switching drivers and other software modules between multiple processors on a handheld or portable device. These techniques can enable the drivers and other software modules to be run on different processors depending on which one of multiple operating modes the device is currently using.

In one general aspect, a dual-mode device is operated in a first operating mode adapted for processing data, in which a first processor executes a driver for a nonvolatile memory and a second processor performs processing of data stored in files on the nonvolatile memory. An instruction is received to switch the device to a second operating mode adapted for at least one of reading or writing files on the nonvolatile memory. The driver for the nonvolatile memory is switched from the first processor to the second processor in response to the instruction, and the driver for the nonvolatile memory is executed on the second processor after switching the driver for the nonvolatile memory from the first processor to the second processor. A communications driver is executed on the first processor in response to the instruction to switch the device to the second operating mode.

Implementations can include one or more of the following features. In the first operating mode, the processing performed by the second processor includes decoding of data stored in files on the nonvolatile memory. The decoding operation includes use of an audio decoder, an image decoder, and/or a file compression decoder. The communications driver is a driver for controlling input/output functions of the device. The communications driver can be a universal serial bus (USB) driver or a wireless interface driver. The first processor is a microprocessor and the second processor is a coprocessor. The first processor and the second processor share a buffer memory and operate in a noncoherent architecture or coherent architecture. When operating in the second operating mode, data to be written to the nonvolatile memory is received at the first processor using the communications driver, the received data is stored to a buffer memory, and data is written from the buffer memory to the nonvolatile memory using the driver for the nonvolatile memory on the second processor. The nonvolatile memory is a flash memory.

In another general aspect, a device is switched from a playback mode to a disk storage mode, and a driver for a nonvolatile memory is moved from a first processor to a second processor in response to switching the device from the playback mode to the disk storage mode. While operating in the disk storage mode, data received on a communications interface is stored to a buffer memory using the first processor, and data stored in the buffer memory is written to the nonvolatile memory using the driver for the nonvolatile memory on the second processor.

Implementations can include one or more of the following features. The second processor is a coprocessor. in the playback mode, the device is adapted to use the coprocessor for decoding audio data. An instruction is sent from the first processor to the coprocessor to write data stored in the buffer memory to the nonvolatile memory. The following operations can be performed iteratively: storing data received on the communications interface to the buffer memory using the first processor; sending an instruction from the first processor to the coprocessor to write the data stored in the buffer memory to the nonvolatile memory; and writing the data stored in the buffer memory to the nonvolatile memory using the driver for the nonvolatile memory on the coprocessor in response to the instruction. The instruction from the first processor to the coprocessor for each iteration includes an address for the data in the buffer memory. A communications driver is executed on the first processor in the disk storage mode.

In another general aspect, a primary processor is operable to execute storage device driver software in a first operating mode and a communications driver in a second operating mode. A coprocessor is operable to execute a decoding software module in the first operating mode and the storage device driver software in the second operating mode.

Implementations can include one or more of the following features. The first operating mode is adapted for decoding encoded data, and the second operating mode is adapted for reading and/or writing files containing encoded data from or to a storage device without decoding the encoded data. A buffer memory is shared by the primary processor and the coprocessor.

DESCRIPTION OF DRAWINGS

Like reference symbols in the various drawings indicate like elements.

DETAILED DESCRIPTION

Figure 1:
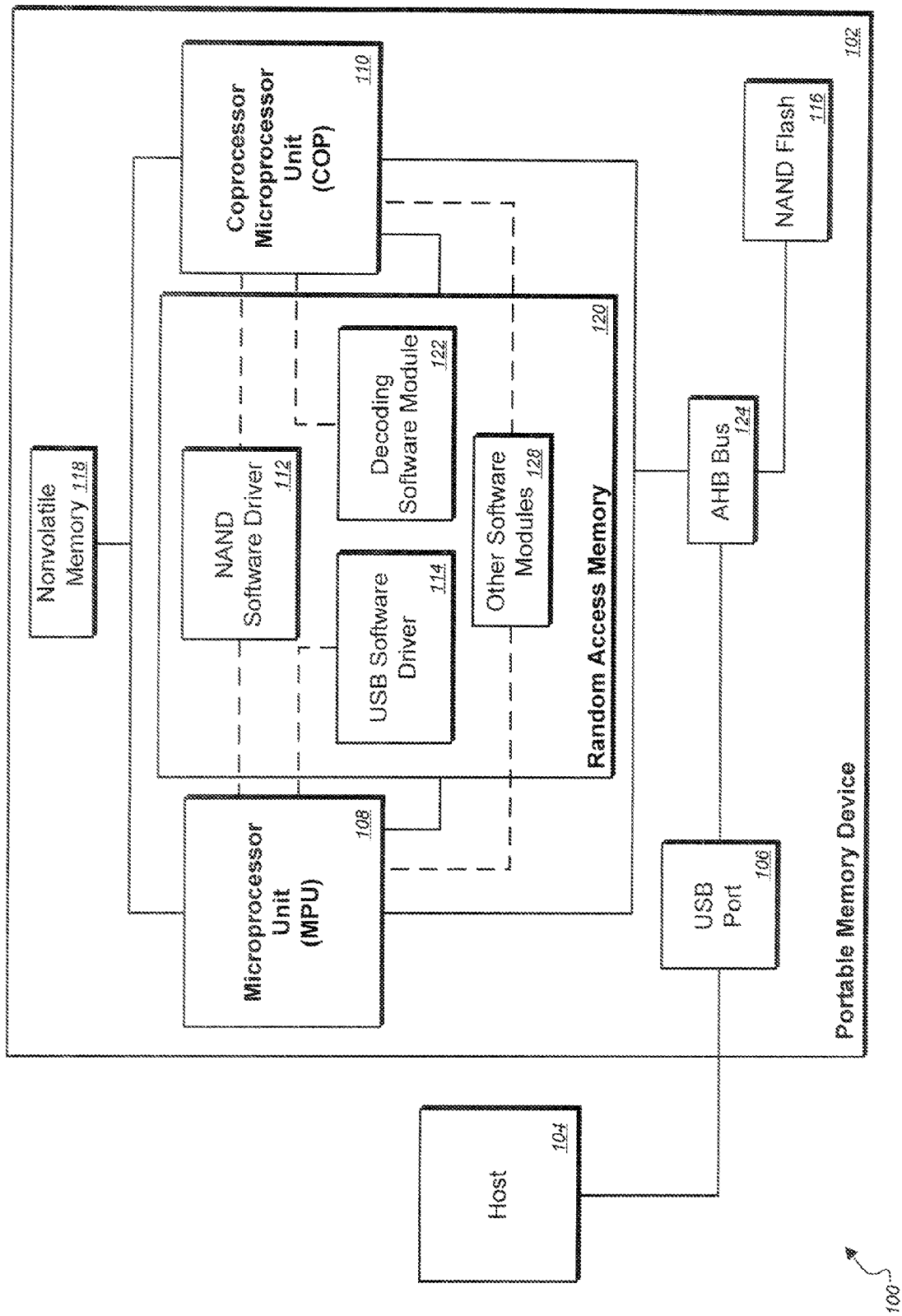
FIG. 1 is a block diagram of a portable flash memory device.

FIG. 1 is a block diagram of system 100 that includes a portable flash memory device 102. The portable flash memory device 102 may be, for example, an MP3 player, a cell phone, a PDA (portable digital assistant), a global positioning system, a portable processing device, a mass storage device, a portable audio/visual recording device, a portable video player, or any other device that incorporates a flash memory or other storage device. Generally, the described techniques involve devices that switch between different modes of operation (e.g., a playback mode and a storage mode). Although the technology is described in context with NAND flash memory, other storage media may be utilized in the portable memory device, such as hard disk drives, magnetic disks, removable disks, NOR flash, EPROM, EEPROM, or other solid state memory device. The portable flash memory device 102 is capable of selecting a particular processor to perform NAND software driver operations in a flash memory device, such as a read, a write, an erase, or a verify operation, for example. In some implementations, the portable flash memory device 102 can transfer operations between processors as necessary for improved device performance.

The portable flash memory device 102 may be included in a system 100 that further includes an external host device 104. Among other things, the portable memory device 102 can be used to display, transfer, playback, or execute media that has been previously obtained by way of the host device 104. For example, the portable memory device 102 can be an iPod™ available from Apple Computer of Cupertino, Calif., where an audio file stored on the host device 104 (e.g., a laptop or desktop computer) has been loaded into the iPod™ device. Upon receiving a file, the portable memory device 102 can access the audio file, and the audio file can be selected for broadcast over a sound capable device, such as headphones, speakers, sound cards, and the like. In some implementations, other types of files can be uploaded onto the portable memory device. For example, the uploaded file can be a video or picture file that is meant for display only, in which case the uploaded file can be broadcast over an image medium, such as an LCD (liquid crystal display) screen. The portable memory device 102 may receive files, such as video, audio, still images, and the like, through various communication media. For example, portable memory device 102 may receive a file from the host device 104 through a USB (universal serial bus) port 106, a wireless connection (e.g., Bluetooth, Ethernet, wireless Ethernet), a serial port, an infrared port, or other such technologies. The host device 104 can be any type of digital computing device, such as a laptop, desktop, workstation, personal digital assistant, server, blade server, mainframe, or other appropriate computer.

As shown in FIG. 1, the portable memory device 102 includes a microprocessor unit (MPU) 108 and a coprocessor unit (COP) 110. In some implementations, the MPU 108 may be, for example, a central processing unit, or other master processing device for the portable memory device 102. The MPU 108 can execute software module instructions or control other memory modules within the portable memory device 102. For example, the MPU 108 can be used to execute a NAND software driver 112, which may control read, write, erase and verify operations. In addition, the MPU 108 may be used to execute a USB software driver 114, or similar software for controlling the operation of any other bus architecture on the portable memory device 102. The MPU 108 can use the software instructions within the USB software driver 114 to manage file transactions occurring between the memory device 102 and the host device 104.

In addition, the MPU 108 can delegate operations to other processors in the system 100, such as coprocessor (COP) 110. In some implementations, the other processor may include a coprocessor, an external processor, or other such device available to the portable memory device 102. For example, the MPU 108 can delegate NAND software driver operations to another processor, thereby freeing up the main processor for other tasks, such as monitoring the USB port 106. Alternatively, the MPU 108 can delegate USB bus transactions to the COP 110.

Typically, the MPU 108 may be a resource used to perform system functions. For example, the MPU 108 can monitor or manage other software modules on the portable memory device 102, such as communication drivers or memory drivers, and the like. In some implementations, the MPU 108 may transfer at least some system functions to the coprocessor unit (COP) 110. For example, when switching from a storage or disk mode to a playback mode, the MPU 108 may transfer memory driver operations (e.g., writing or reading functions) to the COP 110, enabling the MPU 108 to perform other functions, such as managing the USB software driver 114. For purposes of this description, the playback mode may include the ability to display an image or other data or to otherwise decode compressed and/or encoded data in addition to decoding and playing audio files.

As illustrated in FIG. 1, the coprocessor unit (COP) 110 may manage a decoding software module 122. The decoding software module 122 may be, for example, an audio decoder (e.g., MP3, WAV), an image decoder (TIF, JPG), or a file compression decoder (ZIP, PDF). For example, a typical audio decoder can decode MP3 files. The audio decoder may decode the files for playback through external speakers (e.g., connected to an audio jack (not shown) of the device 102). The audio decoder may also convert audio data in compressed format (e.g. MP3) to an uncompressed format, such as WAV, AIFF, or PCM. The uncompressed data can then be edited or burned to a compact disc, either on the portable memory device 102 or by delivering the data through the USB port 106 to the host device 104, for example. In some implementations, the COP 110 can be a smaller device, with a limited amount of functionality compared to the MPU 108. For example, the MPU 108 may contain a module to execute instructions for an LCD screen, however, the COP 110 may not include this functionality because the redundancy is unnecessary when extra cost or limited space are of concern.

The NAND software driver 112 includes software instructions that can perform various operations on a NAND flash memory device 116. The NAND software driver 112, as with other software drivers and modules, is typically stored in nonvolatile memory (NVM) 118, or other static memory located within the portable memory device 102. In some implementations, the NAND software driver 112 may be stored in the NAND flash device 116, or additional memory resource, such as EEPROM, NOR flash, or nonvolatile random access memory (NV-RAM). The NAND software driver 112 can be accessed from stored memory and loaded into random access memory (RAM) 120 upon startup of the device 102, or alternatively, when instructed to do so (e.g., when a request to access the NAND is received). Upon loading into RAM, either microprocessor (MPU) 108 or coprocessor (COP) 110 can execute the software to perform the driver operations In addition to the NAND software driver 112, other software, such as USB software driver 114, decoding software module 122, or other software modules 128 can be retrieved from the nonvolatile memory 118 and executed by one or more processors in the portable memory device 102. For example, a stored software driver, such as software module 128, can be loaded into the RAM 120, and executed by the microprocessor (MPU) 108 or the coprocessor (COP) 110.

In some implementations, the NAND software driver operations can be assigned to specific operating modes, such as "disk mode" or "playback mode" in an MP3 player or other such device that has multiple modes of operation. For example, the portable memory device 102 may operate in disk mode when files, such as file containing MP3 data, are being uploaded to the host device 104 from the portable memory device 102 or, conversely, downloaded from the host device 104 to the portable memory device 102. Generally, the disk mode is used for the transfer or copying of entire files onto or off of the portable memory device 102. Alternatively, the portable memory device 102 may operate in playback mode when file transfers are not taking place. In the playback mode, the data in the portable memory device 102 can be read or used in some manner, such as when MP3 data is played as audio output, video data is used to provide a video feed, or image data is used to display an image either on the portable memory device 102 itself or by sending the data to an external device through some type of communication link. Generally, the playback mode involves accessing and interpreting (e.g., decompressing, decoding, streaming, or decrypting) data contained in the files stored in the portable memory device 102.

The portable memory device 102 may operate in disk mode when the host device 104 is writing, transferring, or uploading files to the portable memory device 102. The portable memory device 102 may also operate in disk mode when the host device 104 is reading, copying, or transferring files from the portable memory device 102 to the host device 104. For example, the portable memory device 102 may automatically switch to disk mode when a user first connects the device 102 to the host device 104 device using the USB port 106 or when it receives a command from the host device 104 (e.g., using software running on the host device 104). When initial operations are completed, or alternatively, when a file upload is complete, the portable memory device 102 may exit disk mode and enter the playback mode. In some implementations, the user may choose to interrupt the upload and manually put the device in playback mode. Alternatively, the host device may keep the portable memory device 102 in disk mode until a specified amount of time has passed, or initialization operations have been completed. In general, operations in the disk mode may include identifying a particular file and then transferring that file from an external storage medium, such as host device 104, to a memory location on the portable memory device 102. In some implementations, disk mode operation may not require an interpretation of data included in the files.

The portable memory device 102 may switch to playback mode upon completing disk mode operations, such as writing files to the portable memory device 102, or alternatively, may be placed into playback mode by a user. In some implementations, the host device 104 may send a signal to the portable memory device 102 to automatically switch to playback mode upon completion of disk mode operations. The playback mode operations can include displaying still images, executing audio or video files, or simply waiting for a user interaction to occur. For example, the portable memory device 102 can suspend in playback mode for a user interaction, such as selection of a song in an MP3 player. In some implementations, the device 102 can turn itself off when a user does not select media within a specific time period.

The MPU 108 (e.g., using software instructions within an operating system of the portable memory device 102) can determine which processor executes the NAND software driver operations. In some implementations, the determination may be based on the current mode of operation. For example, the portable memory device 102 can be programmed to run the operations on a particular processor when the portable memory device 102 is in disk mode. The operations may be carried out by any processing device in the system 100, but selecting a particular processor, such as COP 110, to perform specific operations during a specific operating mode can increase system performance, provide increased operational performance, and/or free up processing resources for other operations.

For example, the portable memory device 102 may be in playback mode and microprocessor (MPU) 108 can be executing the NAND software driver 112 operations, while the coprocessor (COP) 110 can simultaneously execute the decoding software module 122 operations, such as for decoding MP3 files. During the execution of these software operations, the portable memory device 102 may receive an instruction to switch into disk mode. Typically, upon receiving the switch into disk mode instruction, the MPU 108 can continue operations for the NAND flash driver and begin to execute the USB software driver operations by processing information from the USB port 106. In some implementations, switching to disk mode may result in disabling the decoding operations executed by the COP 110. As a result, the COP 110 may become idle until further instructions can be received. However, to free up the MPU 108 and improve operational performance, the MPU 108 can delegate the NAND flash driver operations to the COP 110 allowing the MPU 108 to execute the USB software driver operations while in disk mode. Thus, the COP 110 executes operations for the NAND software driver 112, and the MPU 108 executes operations for the USB software driver 114.

In some implementations, the MPU 108 may execute additional software driver operations while operating the NAND software driver 112, some or all of which can be transferred to the coprocessor unit 110 as desired (e.g., when the device 102 switches to a different operating mode). Alternatively, the additional software driver operations may be maintained on the MPU 108 when switching the NAND software driver 112 to the COP 110. Typically, the processing intensive software operations (e.g., the NAND software driver 112 and the USB software driver 114) are segregated between the MPU 108 and the COP 110. However, in some implementations, one or both of the processors may simultaneously handle other less processing intensive software operations, such as may be included in other software modules 128 that can be loaded into the RAM 120. Other software modules 128 may include, for example, a memory management unit, a display software module, or a wireless communications software module. In some implementations, only a portion of the software drivers may be transferred to the COP 110, leaving the remainder of the drivers to be performed by the MPU 106.

As shown in FIG. 1, the portable memory device 102 also includes an advanced high speed bus (AHB) 124. The AHB architecture 124 is typically designed to provide standard bus protocols for connecting custom logic and specialized functions, such as switching functionality between processors. The portable memory device 102 can utilize the AHB architecture 124 to enable communications between and among the MPU 108, the COP 110, the NAND flash 116, and/or the USB port 106. For example, the AHB architecture 124 can utilize split transactions to perform operations faster. An example of a split transaction can include a read operation that is split into a read request transaction that contains an address to read from, and a memory reply transaction that contains the actual data. The split transaction can allow the USB bus 106, for example, to be made available for other operations, while memory is being read from the specified address. In some implementations, the AHB architecture 124 can be independent of the bus protocols used for the processors in system 100.

Figure 2:
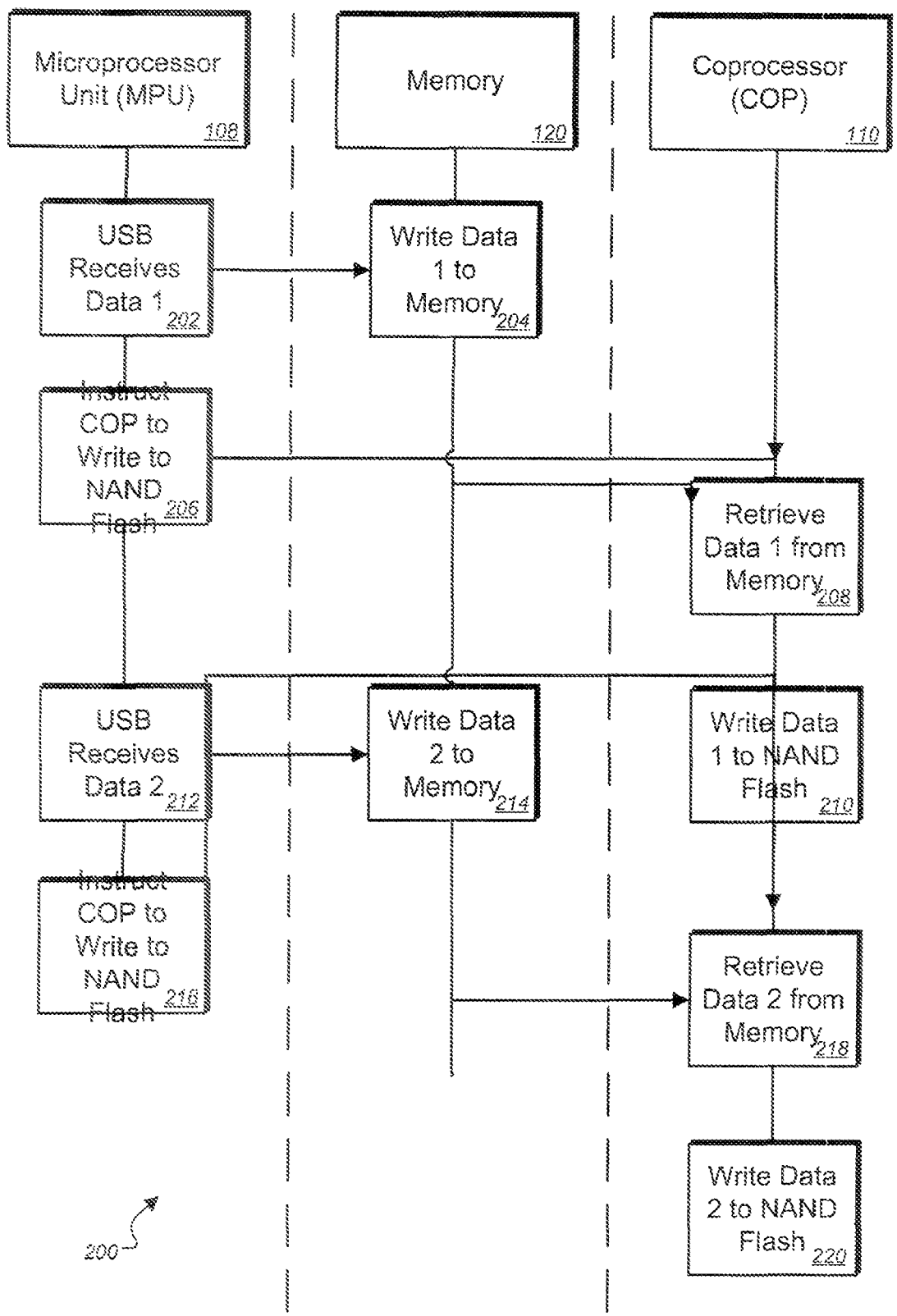
FIG. 2 is a flow diagram of a process for switching performing USB driver operations on a primary processor and performing NAND software driver operations between a primary and on a secondary processor.

FIG. 2 is a flow diagram of a process 200 for performing USB driver operations on a primary processor and performing NAND software driver operations on a secondary processor. The primary processor may be the microprocessor unit (MPU) 108 and the secondary processor may be coprocessor unit (COP) 110. The processors 108 and 110 can share a memory space, or buffer, such as random access memory (RAM) 120, to perform complementary system functions. For example, the MPU 108 may execute USB driver operations, while the COP 110 executes NAND driver operations. Thus, the MPU 108 can monitor and control operations of the USB port 106 while writing of data is handled by the COP 110. Accordingly, the MPU 108 may receive 202 a first set of data on the USB port 106. The first set of data may include a data content portion and an address portion identifying a particular location in the NAND flash memory 116. Upon receiving a first set of data, the MPU 108 transfers 204 the data content and address into RAM 120 and instructs 206 the coprocessor (COP) 110 to write the data to the NAND flash memory 116 using the NAND software driver operation currently residing in the COP 110. The MPU 108 can sequentially or concurrently write the first set of data to RAM 120 and instruct the COP 110 to write the data to a particular address on the NAND flash memory device 116. In some implementations, the MPU 108 can iteratively perform the process of receiving data, writing data to the memory buffer, and instructing the COP 110 as to where to write the data in the NAND flash memory device 116.

Upon receiving an instruction 206 from the MPU 108 to write the data to the NAND flash memory 116, the COP 110 retrieves 208 the first data from the RAM 120. For example, the COP 110 can access the RAM 120 and obtain the data previously written by the MPU 108 (at 204), in some cases leaving a copy of the data on the RAM 120 and adding a new copy of the data to the COP 110. In some implementations, the COP 110 can signal the MPU 108 when the data has been retrieved, such that the MPU 108 can clear the data from RAM 120. Alternatively, the COP 110 can signal the MPU 108 upon writing the data to the NAND flash memory 116. In certain implementations, the COP 110, or other system processor, can clear the data from the RAM 120 without notifying the MPU 108. In any event, after retrieving the first data from the RAM 120, the coprocessor (COP) 110 writes 210 the first data to the NAND flash memory 116. While the COP 110 performs retrieval and write operations for previously received data, the MPU 108 may continue to receive data on the USB port 106. In some implementations, the data can be received and transferred into RAM 120 asynchronously, while notifications for retrieval can be sent to the COP 110 on a particular schedule. For example, the MPU 108 can transfer data to RAM 120 and wait to inform the COP 110 about the new data until the COP 110 is available. Alternatively, the MPU 108 may synchronously inform the COP 110 each time the data is written to the RAM 120. In some implementations, the data may be written to a mass storage device, other than RAM or NAND flash memory, such as a disk drive.

As illustrated in FIG. 2, the MPU 108 receives 212 a second set of data on the USB port 106. Next, the MPU writes 214 the second set of data to the RAM 120 and instructs 216 the COP to write the data to the NAND flash memory 116. Upon receiving an instruction 216 from the MPU 108 to write the second data to the NAND flash memory 116, the COP 110 retrieves 218 the second data from the RAM 120 and writes 220 the second data to the NAND flash memory 116. Although only two cycles of incoming data are depicted in FIG. 2, several cycles of data can be received on the USB port 106, and transferred to the COP 110 to perform writing operations.

In some implementations, a protocol for managing the RAM 120 in the multiprocessor system 100 may be incorporated to ensure data is not lost or overwritten before being transferred from the RAM to the NAND flash memory 116. For example, a memory management unit can manage the data transferred in or out of the RAM 120 by maintaining the data in two or more separate memory areas. A memory management unit (MMU) can include software instructions in a processing device responsible for handling memory accesses requested by another processing device in the system, such as MPU 108. The memory management unit (MMU) can perform operations such as the translation of virtual addresses to physical addresses (i.e., virtual memory management), memory protection, cache control, and bus arbitration. For example, the MMU can perform cache management operations on portable memory device 102 to ensure data is properly stored and retrieved from the RAM 120. The MMU may monitor external access to the processor memory in the portable memory device 102.

When data shared among multiple processors or software modules is cached, it is necessary to ensure that different subsystems are coherent before allowing transfers into or out of the cache to occur. In a coherent architecture (e.g., hardware cache coherency), hardware is used to maintain cache and memory coherency and updates the state of the cache based on external events, such as direct memory access (DMA) events or coprocessor activities. In a noncoherent architecture (e.g., software cache coherency), software is used to maintain cache and memory coherency. For example, software can be used to monitor for changes to memory, such as through DMA or coprocessor activities, and to invalidate the cache and/or flush data from the cache in response to such changes.

In some implementations, when a system includes two or more microprocessors, the system may benefit from having separate memory space. For example, system 100 may improve accuracy by having memory spaces that are separate from the larger RAM 120 that the individual processors will access. The memory management unit can be stored in the separate memory space and manage some or all of the memory transactions on the device.

Figure 3:
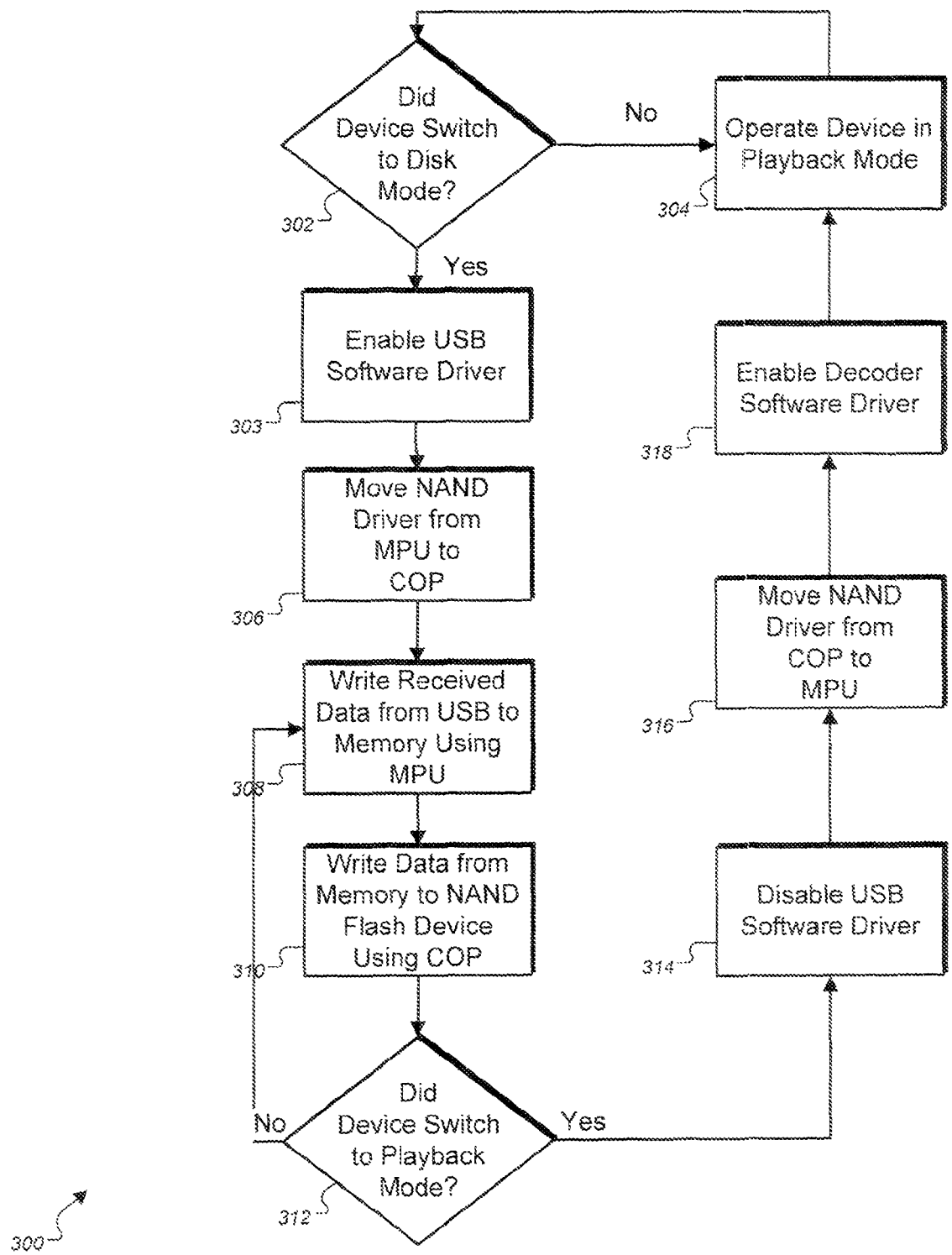
FIG. 3 is a flow diagram for determining which processor operates a driver in a portable flash memory device.

FIG. 3 is a flow diagram of a process 300 for determining which processor operates a driver in a portable flash memory device. For example, the MPU 106 can transfer certain drivers or other software modules to the coprocessor (COP) 110, thereby allowing the performance of the driver or other software operations to be completed by COP 110. In some implementations, the MPU 106 can transfer operations other than NAND driver operations to a separate microprocessor. For example, MPU 106 can transfer USB driver operations to the COP 110. In alternative implementations, each microprocessor available in a device may transfer some or all operations to another microprocessor. In addition, the MPU 106 may execute instructions that cause certain operations to switch processors (i.e., to cause the operations to be performed on a different processor) based on a particular operating mode. For example, while the portable memory device 102 is functioning in playback mode, the MPU 106 can verify (at 302) that the operating mode has not changed, such as from playback mode to disk mode. If the operating mode has not changed, then the portable memory device 102 may continue to operate 304 in playback mode, and continue utilizing the current allocation of operations between processors (e.g., using a primary microprocessor for performing NAND flash memory driver operations and a coprocessor for performing decoding operations).

In some implementations, the portable memory device 102 may switch processors based on other system changes, such as a user interaction or an external computer system interruption. If, for example, the MPU 106 determines a change of mode has occurred, the USB software driver 114 can be enabled 305 to prepare the MPU 108 for receiving data on the USB port 106. At approximately the same time, the portable memory device 102 may move 306 the NAND software driver operations and/or other software operations from one processor to another. For example, in playback mode, the COP 110 may have been decoding files for use on the portable memory device 102 until the mode was switched to disk mode. Upon switching modes, the portable memory device 102 halts decoding on the COP 110 and moves the NAND software driver operations to the COP 108, freeing up the MPU 108 to manage the USB software driver 114.

When the NAND software driver is transferred to the COP 110, the MPU 108 writes 308 the received data from the USB bus to the RAM 120 and notifies the COP 110 of the received data and its location in RAM 120. Upon receiving such a notification, the COP 110 writes 310 the data from the RAM 120 to the NAND flash memory 116. Writing data from the RAM to the NAND flash memory 116 can also occur iteratively while the MPU 108 continues to send instructions to the COP 110.

During each step of writing to the NAND flash memory 116, a verification can be performed by the MPU 108 to determine whether or not the portable memory device 102 has switched from disk mode into playback mode. For example, a user may interrupt the writing of data by manually switching the portable memory device 102 into playback mode. If the operating mode has not changed, the portable memory device 102 may continue operating in disk mode and perform writing operations 308 and 310 for the received data. However, if the portable memory device 102 switches 312 from disk mode to playback mode, the MPU 108 may reassign the current operations. For example, the MPU 108 may disable 314 the USB software driver 114 on the MPU 108, switch operations of the NAND driver from the COP 110 to the MPU 108, and enable 318 the decoder software driver to begin decoding operations on the COP 110. In some implementations, disabling the USB software driver 114 and enabling the decoder software driver may involve removing the drivers from the respective processors. Alternatively, the MPU 108 may suspend the operations until the portable memory device 102 has been switched back into disk mode.

The invention and most of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. Portions of the processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. In some implementations, the described processes and techniques may be limited to use in connection with NAND flash memories or other nonvolatile memories in which individual memory locations are not separately addressable. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made. For example, in some cases, operations can be performed in a different order than that described and shown in the Figures. In addition, the techniques can be used in connection with nonvolatile memories other than NAND flash memories, such as other memories in which data typically cannot be randomly accessed and/or retrieved on a byte-by-byte basis. Moreover, loading of a predetermined page of data from the flash memory blocks into the register can be performed in response to one or more predetermined conditions other than the receipt of a reset signal. Accordingly, other implementations are within the scope of the following claims.

What is claimed is:

1. A system comprising:
   a primary processor operable to execute storage device driver in a first operating mode of a device and a communications driver in a second operating mode of the device; and
   a coprocessor operable to execute a decoding software module in the first operating mode and the storage device driver in the second operating mode, wherein execution of the storage device driver switches from the primary processor to the coprocessor when switching the device from the first operating mode to the second operating mode.

2. The system of claim 1 wherein the first operating mode comprises a mode adapted for decoding encoded data.

3. The system of claim 1 wherein the second operating mode comprises a mode adapted for at least one of reading or writing files containing encoded data on a storage device without decoding the encoded data.

4. The system of claim 1 further comprising a buffer memory shared by the primary processor and the coprocessor.

5. A system comprising:
   a first means for executing a nonvolatile memory driver in a first operating mode of a device and for executing a communications driver in a second operating mode of the device;
   a second means for executing a decoding module in the first operating mode and for executing the nonvolatile memory driver in the second operating mode, wherein execution of the nonvolatile memory driver switches from the first means to the second means when switching the device from the first operating mode to the second operating mode; and
   means for controlling switching between the first operating mode and the second operating mode.

6. The system of claim 5 further comprising a nonvolatile memory.

7. The system of claim 6 further comprising:
   a buffer memory;
   means for coordinating storage of data received on a communications interface in the buffer memory and writing of data stored in the buffer memory to the nonvolatile memory.

8. A method for operating a dual-mode device, the method comprising:
   executing a NAND software driver using a first processor, the NAND software driver configured to execute different types of transactions with a NAND flash memory in a portable device;
   receiving one or more instructions to switch the portable device between a first mode configured to transfer data between the NAND flash memory and a host device and a second mode configured to present data stored in the NAND flash memory to a user through the host device;
   automatically switching execution from the first processor to a second processor of at least a subset of the different types of transactions between the NAND software driver and the NAND flash memory; and
   presenting data to the user through the host device using the second processor in response to at least switching the portable device between the first mode and the second mode.

9. The method of claim 8, wherein the at least a subset of the different types of transactions comprises decoding of data stored in files on the nonvolatile memory.

10. The method of claim 9, wherein the decoding operation comprises one of an audio decoder or an image decoder.

11. The method of claim 9, wherein the decoding operation comprises a file compression decoder.

12. The method of claim 11, further comprising executing a driver for controlling input and output functions of the device.

13. The method of claim 12, wherein the driver comprises one of a universal serial bus driver or a wireless interface driver.

14. The method of claim 8, wherein the first processor comprises a microprocessor and the second processor comprises a coprocessor.

15. The method of claim 8, wherein the first processor and the second processor share a buffer memory and operate in a noncoherent architecture.

16. The method of claim 8, wherein the first processor and the second processor share a buffer memory and operate in a coherent architecture.

17. The method of claim 8 wherein, when operating in the second operating mode, the method further comprises:
   receiving data to be written to the NAND flash memory at the first processor;
   storing the received data to a buffer memory; and
   writing data from the buffer memory to the NAND flash memory using the second processor.

18. An article comprising a non-transitory, machine-readable medium storing instructions for causing one or more processors to:
   execute a NAND software driver using a first processor, the NAND software driver configured to execute different types of transactions with a NAND flash memory in a portable device;
   receive one or more instructions to switch the portable device between a first mode configured to transfer data between the NAND flash memory and a host device and a second mode configured to present data stored in the NAND flash memory to a user through the host device;
   automatically switch execution from the first processor to a second processor of at least a subset of the different types of transactions between the NAND software driver and the NAND flash memory; and present data to the user through the host device using the second processor in response to at least switching the portable device between the first mode and the second mode.

19. The article of claim 18, wherein the at least a subset of the different types of transactions comprises decoding of data stored in files on the nonvolatile memory.

20. The article of claim 19, wherein the decoding operation comprises one of an audio decoder or an image decoder.

21. The article of claim 19, wherein the decoding operation comprises a file compression decoder.

22. The article of claim 21, the instructions further causing one or more processors to execute a driver for controlling input and output functions of the device.

23. The article of claim 22, wherein the driver comprises one of a universal serial bus driver or a wireless interface driver.

24. The article of claim 18, wherein the first processor comprises a microprocessor and the second processor comprises a coprocessor.

25. The article of claim 18, wherein the first processor and the second processor share a buffer memory and operate in a noncoherent architecture.

26. The article of claim 18, wherein the first processor and the second processor share a buffer memory and operate in a coherent architecture.

27. The article of claim 18 wherein, when operating in the second operating mode, the instructions further causing one or more processors to:

receive data to be written to the NAND flash memory at the first processor;

store the received data to a buffer memory; and write data from the buffer memory to the NAND flash memory using the second processor.

* * * * *